US005369548A

United States Patent [19]
Combs

[11] Patent Number: 5,369,548
[45] Date of Patent: Nov. 29, 1994

[54] TAMPER PROTECTOR ENCLOSURE FOR DISTRIBUTION BOX AND ASSOCIATED WIRING

[76] Inventor: Billy O. Combs, 1961 Mars Hill Rd., Watkinsville, Ga. 30677

[21] Appl. No.: 68,521

[22] Filed: May 27, 1993

[51] Int. Cl.⁵ .............................................. H02B 1/04
[52] U.S. Cl. .................................. 361/643; 174/148; 200/308; 200/333; 361/654; 361/672
[58] Field of Search .............. 174/148; 200/304, 50 A, 200/308, 333; 324/110; 361/622, 641, 643, 654, 657, 658, 666, 672; 379/399, 437, 326, 327, 330, 412, 445; 439/133, 135, 535, 536, 718, 892, 922

[56] References Cited

U.S. PATENT DOCUMENTS

| | | | |
|---|---|---|---|
| 4,638,129 | 1/1987 | Partus et al. | 200/50 A |
| 4,749,359 | 6/1988 | White | 439/133 |
| 4,752,232 | 6/1988 | DeLuca | 439/133 |
| 4,800,588 | 1/1989 | Poster, Jr. | 379/412 |
| 4,823,381 | 4/1989 | Olson | 379/399 |
| 4,825,466 | 4/1989 | Dowler et al. | 379/445 |
| 4,853,960 | 8/1989 | Smith | 379/437 |

*Primary Examiner*—Gregory D. Thompson
*Attorney, Agent, or Firm*—Hopkins & Thomas

[57] ABSTRACT

A tubular body is mounted against a wall of a dwelling and surrounding a distribution box and a portion of incoming cables which terminate within the distribution box. A cover closes the tubular body and switches detect when there is an attempt to remove the body from the wall and when the cover is removed.

15 Claims, 3 Drawing Sheets

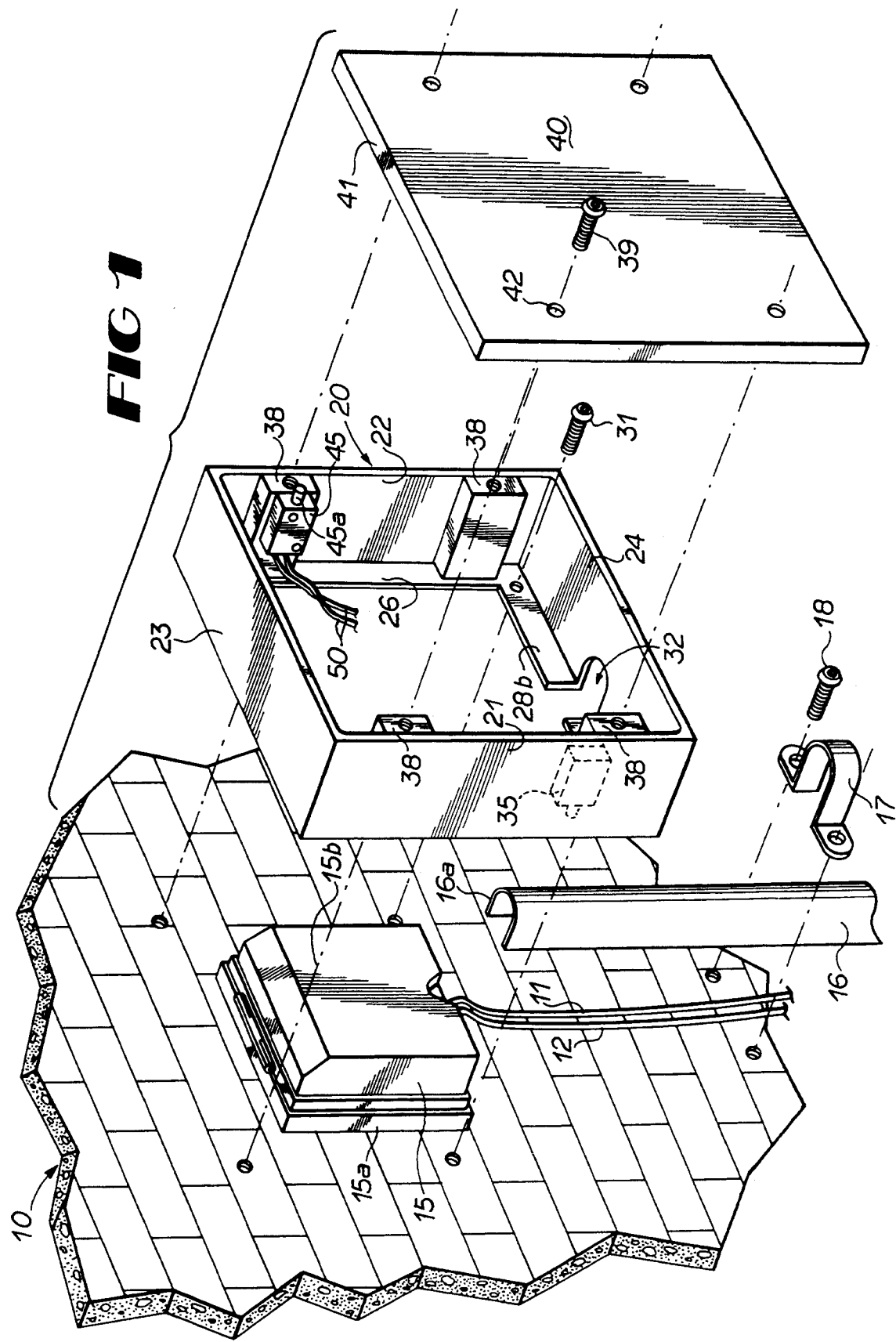

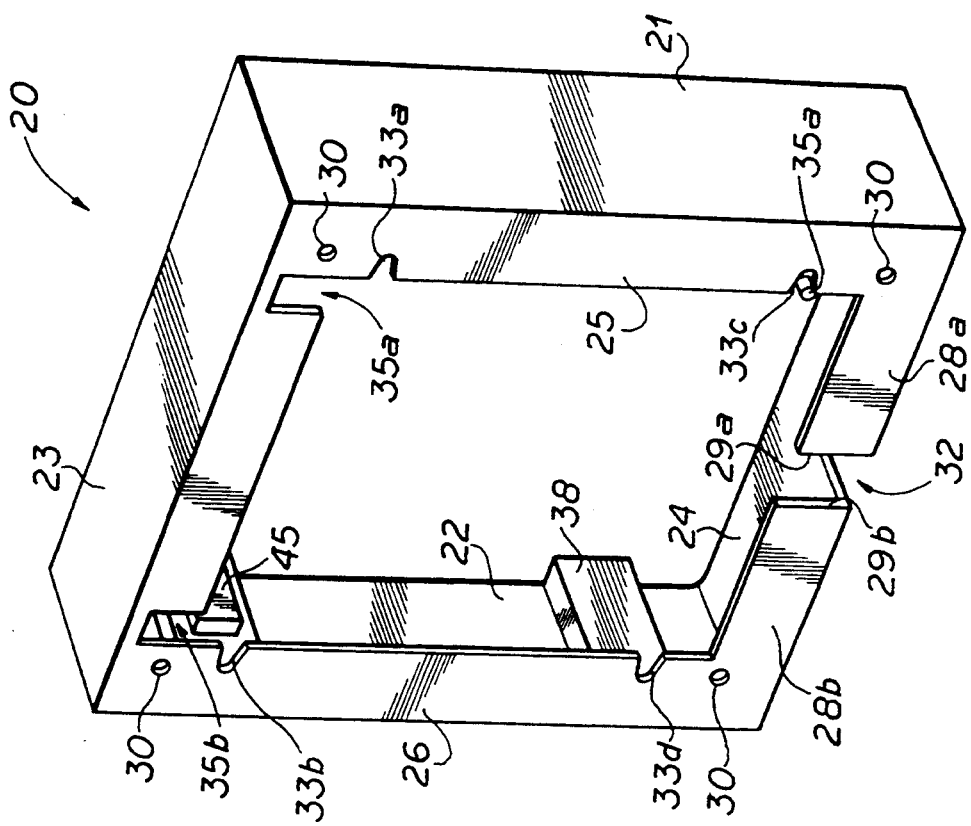
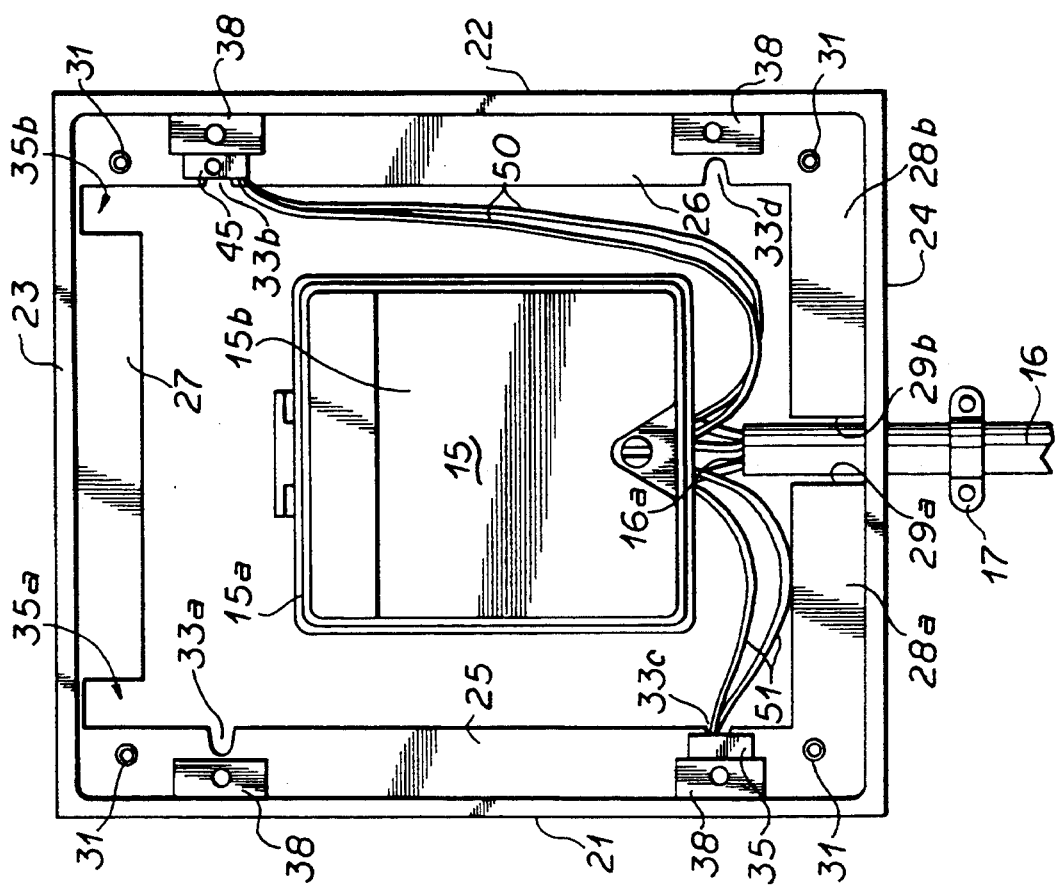

TAMPER PROTECTOR ENCLOSURE FOR DISTRIBUTION BOX AND ASSOCIATED WIRING

BACKGROUND OF THE INVENTION

1. Field of the Invention

This invention relates to a tamper protector enclosure assembly and is more particularly concerned with providing a tamper protector enclosure for an interface device within a distribution box and the associated telephone wiring or power line wiring feeding into and out of such interface device in order to discourage tampering and/or interruption of telephone service or electrical service through the interface device.

2. Background Information

Telephone network interface devices are well known to those skilled in the art, and typically comprise distribution box in which the telephone company's network wiring and the subscriber's wiring are joined at an interface device within the distribution box, as well as providing a demarcation point with regard to the ownership and maintenance responsibility for those telephone lines. Telephone network interface devices typically are provided with some means of sheltering the telephone line terminals joining the telephone company's and subscribers telephone lines. This shelter is usually a distribution box mounted externally on a house or building. The interface device within the box is usually easily accessible for determining whether problems in telephone service are the result of the telephone company's network, or the subscriber's wiring and equipment within the premises being served by the telephone company. The typical telephone network interface device, through which telephone service is provided to the subscriber's building is attached to the exterior of a structure, more typically on a residential rather than a commercial structure, but such devices are also used on commercial structures.

In the prior art, a number of telephone network interface devices exist which pertain and are primarily concerned with the manner and method in which the telephone company's lines are connected Co the subscriber's telephone service lines. The prior art boxes for the network interface devices generally make provision for enclosing the network interface device within a weather-resistant closure, capable of being locked. In a typical residential application, however, the distribution box and the network interface device are mounted upon the exterior of the residence, the cover for the box being only a plastic housing which fastens to the base which carries the network interface device, which, in turn, fastened to the structure.

Typical of the prior art telephone network interface device and distribution box discussed, is an apparatus similar to that disclosed in U.S. Pat. No. 4,853,960 issued to Thomas J. Smith on Aug. 1, 1989 which provides an apparatus for connecting the telephone company's lines to the subscribers' service lines on a network interface baseplate, the baseplate having a covered housing which may be locked into a closed position. The device of Smith may be used for one pair of lines, or multiple pairs in a multi-unit residential or commercial setting.

Another type of network interface device and box disclosed in the prior art is found in U.S. Pat. No. 4,825,466, issued to Dowler et al. on Apr. 25, 1989 which provides a means for interfacing and enclosing a multiple number of telephone lines pairs, typically in a commercial or multi-unit residential facility. Another type of enclosure for a telephone network interface device is disclosed in U.S. Pat. No. 4,823,381 issued to Robert D. Olson on Apr. 15, 1989, which device comprises a locking security cover with an open frame for multiple telephone line pairs installed and connected to outside telephone line service upon a backboard. As with the Dowler patent, the Olson patent is intended primarily for use in either commercial or multi-unit residential facilities, and, as is the case with all the prior art, designed to protect the network interface only, and to limit access to the wired connections within the box of the interface structure.

None of these devices, however, relate to an apparatus which will completely enclose the interface device itself, as well as the associated telephone line wire from the telephone company, and to the subscriber, which feed into and exit the interface device. This is particularly important in those situations where the telephone company subscriber has installed in their residence, or in their business, a centrally wired burglar alarm system which is, itself, able to communicate with a central monitoring or control station through automatic dialing means over the subscribers' telephone lines and the telephone company's network lines.

Where a burglar is intent upon unlawfully entering a person's residence, or business, and is aware of the fact that the premises are guarded by a centrally wired burglar alarm system, it is the typical practice for the burglar to disable the central monitoring feature of the burglar alarm by cutting either or both of the telephone lines feeding into an interface device. Once this has been accomplished, the burglar knows that he will be able to gain ready access to the structure without fear of actuating the alarm system for contacting the central monitoring or control station, which would then notify the local law enforcement authorities to investigate the alarm signaled into the monitoring station.

None of the prior art recited above has taken into account or provided a means for enclosing the network interface device, the telephone company's service line, and the subscribers telephone line, feeding into and out of the interface device. Accordingly, even if a residential or commercial telephone subscriber has an interface device which has a locking cover, telephone service through said interface can be readily interrupted by severing the telephone lines leading into the interface. Also, none of the prior art has provided a means for signaling an alarm within the structure (distribution box) which contains the interface, nor to a central monitoring or control station. The preferred embodiment described, and as claimed, below, makes provision for fully enclosing the telephone network interface device, the subscriber's telephone lines and telephone company's telephone lines to thereby discourage the deliberate interruption of service, yet provide a means for ready access to the enclosed interface device and telephone line pairs to authorized telephone company and burglar alarm system repairmen.

Electrical power lines are also mounted externally on a structure and provided with distribution boxes similar to those of the telephone service, the function being to house the interface network for the incoming power line and the outgoing power lines. The terminals and exposed wires at the interface are not, however, well protected by the distribution box from weather and these terminals and wires become corroded. This is particularly severe when the structure is close to salt water. The invention disclosed herein contemplates providing additional weather proofing protection for electrical power line distribution or junction boxes and the interfaces therein.

SUMMARY OF THE INVENTION

Briefly described, the present invention includes a conventional telephone networking interface which is mounted on a wall surface of a structure, such as a dwelling. Normally this telephone networking interface device is mounted flat against a vertical wall surface of the structure and has a cover, there being cables or wires lead from a source and thence, along a portion of the wall into the distribution box, these wires being interconnected within the distribution box, to wires, cables or conduits which leave the box for providing service within the house or building.

In combination with this conventional distribution box and its associated wiring is a larger external tamper protection box or closure which surrounds this smaller distribution box. This outer protective box includes a rectangular tubular body, open at both ends, the body being formed by opposed side panels and opposed upper and lower panels.

The inner edges of the side panels at the back are turned inwardly to define inwardly protruding flanges through which bolts or screws protrude into the supporting wall of the dwelling. The flanges are in a common flat plane and are received flat against the supporting wall.

The upper and lower panels also have inwardly turned, opposed flanges which are in a common plane with the side flanges and are in a plane perpendicular to the side, top, and bottom panels.

Two or more tamper detection switches are located within the protective box, one switch being actuable when the protective box is removed from the wall and the other when the coverplate is removed from the front of the protective box. These switches are wired to the interface in the distribution box so as to provide appropriate signals to alarm devices in the house or building on which the protective box is mounted, as well as to a remote station. The enclosure provided by the protective box also protects the incoming and outgoing portions of the telephone wires which are within the distribution box. While the protective box is primarily designed to protect a telephone interface box having incoming and outgoing telephone cables against the interruption of telephone service by a would be burglar, the protective box of the present invention is also applicable to protect a power line interface, particularly those close to salt water, which need additional protection from corrosion.

The front opening of the protective box is closed by a coverplate have an inwardly turned peripheral flange forming a perimeter slightly larger than the outside perimeter of the body so as to overlap the front portions of the panels of the body. Bolts or screws with special heads removably secure the cover to the upper and lower flanges. These special heads have hexagonally shape annular openings adapted to receive an allen wrench; however, a central circular stub shaft on the head prevents entry of the allen wrench unless it has a circular central opening which receives the shaft.

When employed with a telephone system, the interface enclosure provided by the protective box, fully encloses the telephone network interface and its distribution box. The protective box also encloses and protects the telephone company's and subscriber's telephone lines feeding along the wall into and exiting the interface or distribution box. Such wires are sometimes themselves protected by a U-shaped or other open channel conduit, tubing, or piping, wherein the open face of the conduit is adjacent the wall surface and acts to enclose the telephone lines adjacent the wall surface.

Accordingly, it is an object of the present invention to provide a tamper protector enclosure assembly that will fully enclose and protect a telephone network interface device and the associated telephone line wiring, feeding connected to the interface device, in order to discourage and prevent the deliberate interruption or destruction of telephone service to the dwelling upon which the interface device is mounted.

Another object of the present invention is to provide a tamper protector box which will encompass a distribution box and provide a signal or alarm when an unauthorized attempt is made to gain access to the distribution box.

Another object of the present invention is to provide a tamper protector box which can be readily adapted for use on both residential or commercial structures.

Another object of the present invention is to provide a tamper protector box which can be easily installed or retrofitted to any new or existing distribution box for a telephone network interface device or a power line network interface device.

Another object to the present invention is to provide a tamper protector enclosure assembly which will enhance the performance and reliability of residential and commercial burglar alarm systems by providing a means for ensuring that telephone service cannot be readily disrupted, and if an attempt is made to disrupt telephone service through the network interface device, to provide or signal to a burglar alarm system and/or a central monitoring or control station.

Another object of the present invention is to provide a means to signal an alarm to a homeowner or businessman within the structure when an unauthorized attempt is made to gain access to the network interface device and/or associated telephone wiring or power line wiring.

Another object of the present invention is to provide a tamper protector box through which a properly authorized telephone repairman or burglar alarm serviceman can gain access to the telephone network interface device with the use of a hand tool typically carried and available to authorized serviceman without the need for obtaining a key to otherwise unlock or open the tamper protector box.

Another object of the present invention is to provide a tamper protector box which is simple to manufacture and install, efficient in operation, inexpensive, and durable in structure.

Other objects, features, and advantages of the present invention will become apparent from the following description when considered in conjunction with the accompanying drawings wherein like characters are referenced designating corresponding parts through the several views.

BRIEF DESCRIPTION OF THE DRAWING

FIG. 1 is an exploded perspective view of a tamper protector enclosure assembly, constructed in accordance with the present invention and installed on a wall of a structure;

FIG. 2 is a front elevational view of the body of the tamper protector box of the assembly illustrated in FIG. 1, the body being installed on the wall of the structure and encompassing the distribution box and wires of the assembly;

FIG. 3 is a rear perspective view of the body shown in FIG. 2;

DETAILED DESCRIPTION OF THE PREFERRED EMBODIMENT

Figure 4:
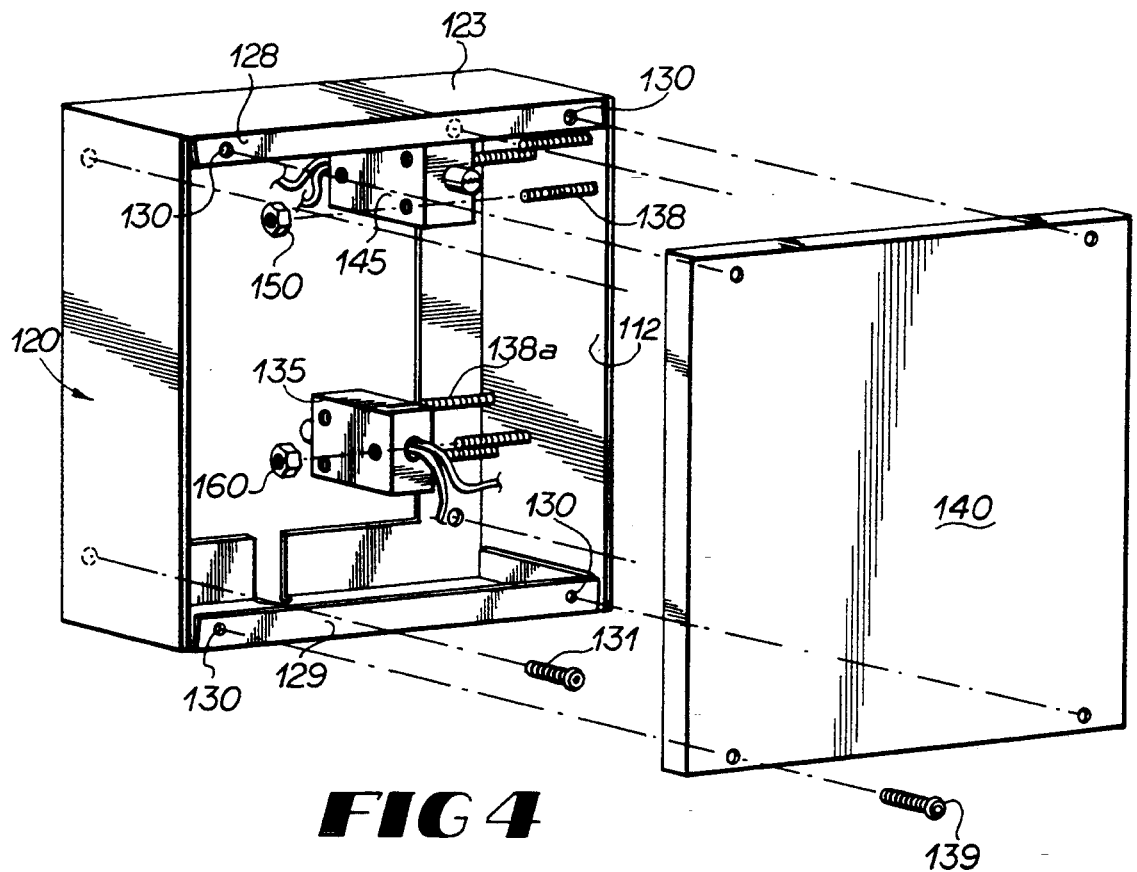
FIG. 4 is a exploded perspective plan view of an alternate version of the tamper protector box of the assembly shown in FIG. 1.

Referring now in detail to the preferred embodiment of the invention as depicted ill the drawings, numeral 10 denotes a vertical exterior wall of a house or building or structure for which telephone and electrical power is provided. The description will be essentially with respect to telephone service. This telephone service is provided from a remote location to the house by a buried cable 11 having wires therein and to the house, itself, through a second cable 12. Typically, these cables 11 and 12 emerge from the ground and are vertically disposed side-by-side, having their individual wires (not shown) connected together appropriately at the interface (not shown) within the distribution box 15. This interface functions to correct the incoming telephone wires to the individual wires of the telephones (not shown) within the house. The conventional distribution box 15 is mounted on the outer surface of wall 10, being fixed in place by bolts (not shown) passing by through its base 15a. A removable cover 15b covers the interface.

The cables 11 and 12 are protected, to a limited extent, by a U-shaped upstanding shield 16 formed of sheet metal bent into the channel shape as depicted in FIG. 1. The shield is received partially around cable 11 and 12 and extends from the ground upwardly so that its upper end 16a abuts the bottom portions of base 15a and cover 15b. One or more straps, clamps or brackets 17, as seen in FIG. 1, are received around the shield 16 and hold the edges of the shield against wall 10. Bolts or screws 18 pass through holes in the feet of the bracket 17 and into wall 10 to secure the shield 16 in place, protecting the cables 11 and 12. The structure thus far described is conventional.

According to the present invention, a larger tamper protector box is mounted over the distribution box 15. This tamper protector box 15 includes a metal, hollow, generally rectangular, tubular body 20 formed of four flat rectangular panels, there being two vertically disposed, spaced, opposed side panels 21 and 22, a top panel 23 and a bottom panel 24. The adjacent upper edges of the side panels 21 and 22 are joined to the opposed upper edges of top panel 23 and the adjacent lower edges of panels 21 and 22 are joined to the edges of bottom panel 24.

The inner edge of the side panels 21 and 22 are turned inwardly to provide spaced opposed back flanges 25 and 26. In like fashion, the inner edge of top panel 23 is turned downwardly, to form top back flange 27 and the inner edge of bottom 24 is turned upwardly to provide spaced bottom flanges 28a and 28b. These flanges 25, 26, 27, 28a and 28b are in a common back plane perpendicular to panels 21, 22, 23 and 24. The ends of flanges 25, 26, 27, 28a and 28b abut each other to thus form a back perimeter which has an open central interior, larger in width and length than the width and length of the distributor box 15.

The bottom flanges 29a and 29b are provided with opposed side edges 29a and 29b which are spaced from each other in the central lower portion of body 20, the space between the two side edges 29a and 29b being greater than the width of shield 29. A U-shaped recess 32 is provided in bottom panel 24, the shape of the edges defining the recess 32 conforming to the exterior cross-sectional shape of shield 16.

The depth of the body 20 is greater that the depth of distribution box 15. Therefore, the front edges of panels 21, 22, 23 and 24 terminate outwardly of the cover 15b of box 15 when the tamper protector box 20 is installed over the box 15.

In the embodiment of FIGS. 1, 2 and 3, the flanges 25, 26, 28a and 28b are provided with four holes 30, seen best in FIG. 3. The body 20 is mounted by being placed against wall 10 so that the flanges 25, 26, 27, 28a and 28b are received flat against the surface of wall 20 and the abutting panels 21, 22, 23 and 24 surround the distribution box 15. Bolts 31 passes through holes 30 and, thence, into premounted sockets 30a in wall 10 for mounting body 20 against the wall 10 in a fixed position, in which flanges 25, 26, 27 and 29 are held flat against wall 10 so that the distribution box 15 is generally centered within the confines of the body 20 as shown in FIG. 2.

When appropriately fixed in place, as shown in FIG. 2, the body 20 is located so that the upper end portion of the shield 16 protrudes upwardly through the recess 32 so that its upper end 16a is well within the confines of the body 20. In such a position, the upper end portion of shield 16 is straddled by and between side edges 29a and 29b. The flanges 25, 26, 27, 28a and 28b form reinforcement for the panels 21, 22, 23 and 24 so as to assure that the rectangular shape of body 20 is maintained.

Along the inner edge portions of the upright, opposed, side flanges 25 and 26 are a pair of transversely opposed, inwardly opening, upper slots, openings or notches 33a and 33b. In like fashion, the inner edge portions of flanges 25 and 26 are provided with a pair of transversely opposed inwardly opening lower slots, openings or notches 33c and 33d which are below the upper opening 33a and 33b, respectively. The function of the openings 33a, 33b, 33c and 33d are to provide spaces through which the plunger or plungers 35a of electrical switches, such as switch 35, seen in FIG. 2, can protrude so as to be depressed by wall 10 when the body 20 is mounted on wall 10.

The upper flange 27 terminates inwardly of the upper portion of the inner edges of flanges 25 and 26 so as to provide a pair of spaced, downwardly opening upper recesses 35a and 35b. These recesses can be used for hooks or other additional mounting means for supporting body 20 against wall 10.

For receiving and supporting the bolts or machine screws, such as bolt 39, seen in FIG. 1, a plurality of mounting blocks 38 are fixedly secured to the inside surfaces of panels 21 and 22. The blocks 38 have flat outer surfaces which are in a common plane with the other edges of panels 21, 22, 23 and 24.

The body 20 is provided with a flat, rectangular cover plate 40, preferably made from sheet metal, the cover plate 40 have a peripheral flange 41 which protrudes inwardly so as to overlap an edge portion of panels 21, 22, 23 and 24, when the cover plate 40 is received over and closes the outer opening of body 20. In such a position, the bolts, such as bolt 39 respectively pass through holes 42 in cover plate 40 and, thence, into the mounting blocks 38.

For detecting when the coverplate 40 is removed from the body 20, or indeed is being tampered with, a switch 45, similar to switch 35 is disposed in the interior of body 20, preferably being mounted on one of the mounting blocks 38. Switch 45 has a plunger 45a which normally protrudes out of the outer opening of box 20 and is spring loaded for being yieldably depressed by the coverplate 40 when the coverplate 40 is mounted on the body 20.

Wires 50 electrically connect the switch 35 to the interface (not shown) of distribution box 15 while wires 51 electrically connect switch 45 to such interface. These switches 35 and 45 can either be normally open or normally closed. A normally opened switch usually requires a flow of electricity through the switch as long as the plunger is depressed and actuates an alarm circuit when the plunger is released. A normally closed switch would complete an alarm circuit. Both types of alarm circuits are well known and hence, no more detailed description is required. The actuation trigger can alarm internally or externally of the structure and/or an alarm in a remote location.

Figure 5:
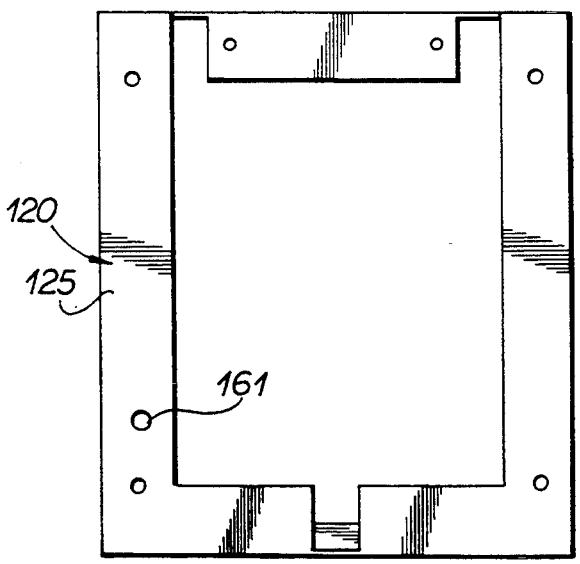
FIG. 5 is a rear elevational view of the alternate preferred embodiment illustrated in FIG. 4.

In the modified embodiment of the present invention as shown in FIGS. 4 and 5, the body 120 and its cover plate 140 are identical to body 20 and coverplate 40 except that in place of the mounting blocks 38, the upper and lower panels 123 and 124 are respectively provided with inwardly protruding opposed flanges 128 and 129, having holes 130. Bolts 139, passing through holes 142 in coverplate 140, secures the coverplate 140 in place. The switches 35 and 45, corresponding to switches 135 and 145 are mounted on threaded studs 138 and 138a which protrude inwardly from the inner surfaces of side panel 122.

The studs 138 protrude through switch 145 and receive nuts, such as nut 150, to fix the position of switch 145 so that its plunger is depressed by the coverplate 140 when the coverplate 140 is installed on body 20. Likewise, studs 138a protrude through switch 135 and receive nuts, such as nut 160, for fixing the position of switch 135 with its plunger protruding through a hole 161 in back of flange 125 so as to engage and be depressed by wall 10, when body 20 is installed.

It will be understood that all of the bolts or machine screws 18, 31, 39, 131, 139 have special heads, each head having an annular recess concentric with the body of the bolt or screw, the outer extremity of the recess being defined by a hexagonal wall and the inner extremity by a stub shaft which blocks use of a conventional allen wrench in the head, unless the allen wrench is modified so as to have a hollow central portion suitable for sliding over the stub shaft. Such a special allen wrench is supplied to telephone repairmen.

In use, the tamper protector box of the present invention is designed to permit only authorized telephone repairmen, or powerline repairmen, as the case may be, to have access to the interior of box 20 so that the distribution box 15 can be opened for access to the interface therein. The tamper protector box, being normally closed around the distribution box 15, provides added protection to retard corrosion of the wires and terminals of the interface in the distribution box 15.

The tamper protector box also protects the exposed wires 11 and 12 from being cut by a would be burglar and the switches 35, 45, 135, 145 provide alarm signals in the event the cover 40 and 140 is removed or the body 20 or 120 is removed from the wall 10.

I claim:

1. A tamper protector assembly for protecting a distribution box mounted on a wall of a dwelling and wires passing along said wall and into said distribution box; the improvement comprising:
   (a) a body having an open rear end and an open front end for being disposed with an edge of its rear end against said wall such that said body surrounds said distribution box, said edge being provided with a recess which permits said wires to pass therethrough,
   (b) means for securing said body to said wall;
   (c) a removable cover plate positioned on said body for closing said open front end; and
   (d) means for retaining said coverplate on said body.

2. The tamper protected distribution box assembly defined in claim 15 including a shield disposed over said wires and protruding through said body.

3. The tamper protected distribution box assembly defined in claim 2 wherein said wires pass from the ground upwardly into said distribution box, said wires passing adjacent to said wall, and said shield is an open trough which encloses said wires and abuts said wall on both sides of said wire, said body having a U-shaped recess through which said shield extends.

4. The tamper protected distribution box assembly defined in claim 3 wherein said means for retaining said coverplate on said body includes a plurality of bolts passing through said coverplate and means within said body for threadedly receiving said bolts, said bolts having heads which prevent the bolts from being removed without the use of special tools.

5. The tamper protected distribution box assembly defined in claim 4 wherein said heads are each provided with an annual recess, the outer periphery of which is defined by a hexagonal surface and the inner periphery of which is defined by a stub shaft.

6. The tamper protected distribution box assembly defined in claim 1 wherein said body is formed of a plurality of flat panels defining a rectangular cross section and flanges protruding inwardly from said panels at said rear opening and said means for securing said body to said wall including bolts passing through said flanges and into said wall for securing said body to said wall.

7. The tamper protected distribution box assembly defined in claim 5 including a switch disposed within said body adjacent to said coverplate, said switch detecting when said coverplate is removed from said body.

8. The tamper detector defined in claim 5 including a switch disposed within said body for detecting when said body is removed from said wall.

9. The tamper protected distribution box assembly defined in claim 5 including a pair of switches within said body, one of said switches detecting when said cover is removed from said body and the other of said switches detecting when said body is sought to be removed from said wall.

10. A tamper protector for protecting a distribution box mounted on a wall of a building from being tampered with, said tamper protector comprising:
   (a) a hollow tubular body having an open rear end and an open front end; said body being so dimensional that it is capable of surrounding said distribution box;

(b) flanges protruding inwardly from edges of said body adjacent to said rear end;

(c) a coverplate for closing said front end;

(d) means for removably retaining said coverplate on said body;

(e) a switch within said body for detecting when said coverplate is removed from said body, 11. The tamper protector defined in claim 10 wherein said hollow tubular member includes four rectangular panels joined to each other for providing a pair of opposed side panels and a top panel and a bottom panel, said flanges being provided with holes through which bolts can be passed for securing said body to said wall.

12. The tamper protector defined in claim 10 wherein said switch is mounted in said body, said switch having a plunger engaging for detecting when said cover is removed from said body.

13. The tamper protector defined in claim 10 including a switch within said body, said switch being adapted to detect when said body is removed from a wall to which it is mounted.

14. The tamper protector defined in claim 10 including a second switch for detecting when said body is removed from said wall when said body is mounted on said wall.

15. A tamper protector for protecting a distribution box mounted on a wall of a building from being tampered with, said tamper protector comprising:

(a) a body having a open front end and an open rear end for being disposed against said wall and for surrounding said distribution box;

(b) means for securing said body to said wall;

(c) a removable cover plate positioned on said body for closing said open front;

(d) means for retaining said cover plate on said body; and (e) said body having a U-shaped recess, through which a shield disposed over said wires protrudes from the exterior through said body to terminate on the interior of said body.

* * * * *

UNITED STATES PATENT AND TRADEMARK OFFICE
CERTIFICATE OF CORRECTION

PATENT NO.   : 5,369,548
DATED        : November 29, 1994
INVENTOR(S)  : Billy O. Combs It is certified that error appears in the above-indentified patent and that said Letters Patent is hereby corrected as shown below:

Column 8, line 20, change "15" to --1--

Signed and Sealed this

Sixth Day of June, 1995

Attest:

BRUCE LEHMAN

Attesting Officer

Commissioner of Patents and Trademarks